June 29, 1948.    G. S. MILES    2,444,106
AUTOMATIC WEATHER STATION
Filed July 18, 1945    2 Sheets-Sheet 2

- INVENTOR -
GEORGE S. MILES
BY
- ATTORNEY -

Patented June 29, 1948

2,444,106

UNITED STATES PATENT OFFICE 2,444,106

AUTOMATIC WEATHER STATION

George S. Miles, Maywood, N. J., assignor to Bendix Aviation Corporation, Teterboro, N. J., a corporation of Delaware Application July 18, 1945, Serial No. 605,789

11 Claims. (Cl. 177—351)

This invention relates to an automatic weather station, and more particularly to a weather station which may be readily transported by an individual and set up in any desired locality in a short time and left unattended for relatively long periods of time; the station at preset time intervals automatically transmitting the desired information regarding various atmospheric conditions of the particular locality in which it has been installed.

An object of the present invention is to provide an automatic chronometric weather station which will transmit radio telegraph signals of the local atmospheric conditions, spaced at such time intervals as to permit the receiving operator to measure the time interval between signals by means of a stop watch, or other timing device.

Another object of the present invention is to provide in an automatic chronometric weather station of the character described, means for transmitting information relative to the barometric pressure, the wind direction, and the wind velocity of the locality in which the weather station has been installed.

A further object of the present invention is to provide an automatic weather station of the character described which will transmit the information pertaining to weather conditions as registered by instruments remotely positioned from the weather station installation.

Still a further object of the present invention is to provide a weather station of the character described to which any number of remotely positioned weather indicating instruments may be connected, and wherein any number of instruments may be interchanged.

Still another object of the present invention is to provide a highly improved, rugged and compact meteorological station of the character described, which shall be easily transportable, simple to install, relatively inexpensive to manufacture; which shall have a large variety of applications, and yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the appended claims.

Figure 1:
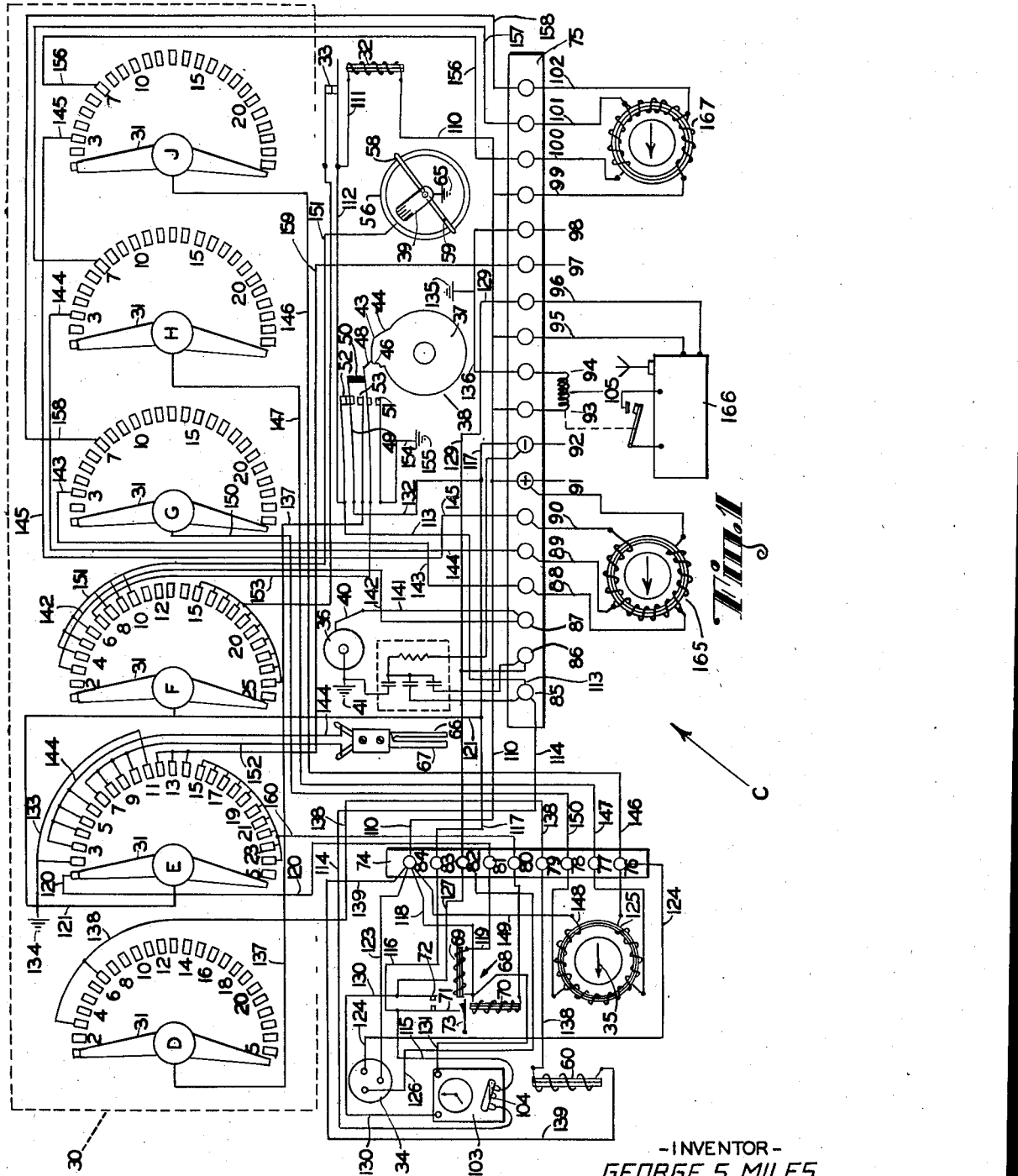
Figure 2:
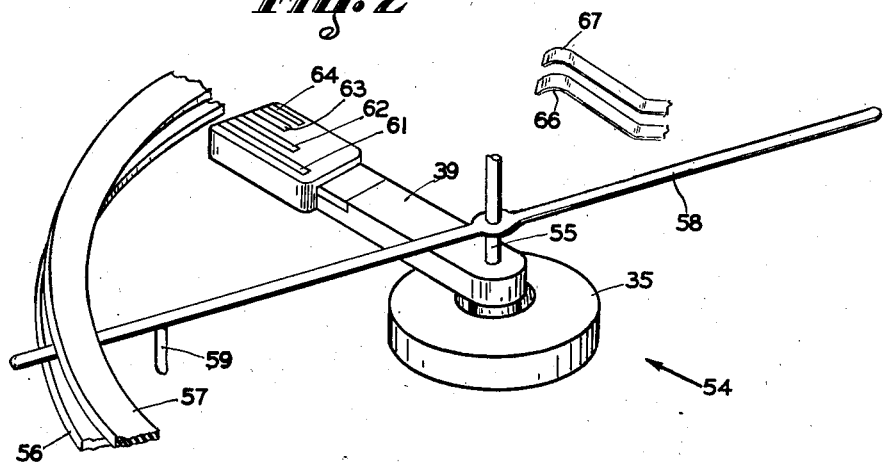
Figure 3:
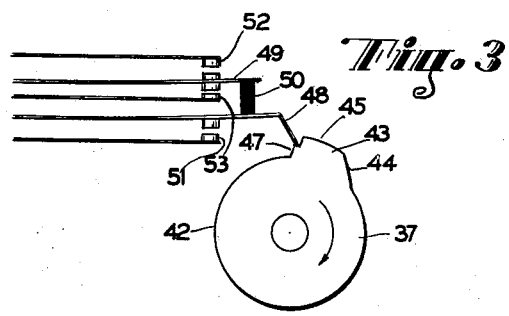
Figure 4:
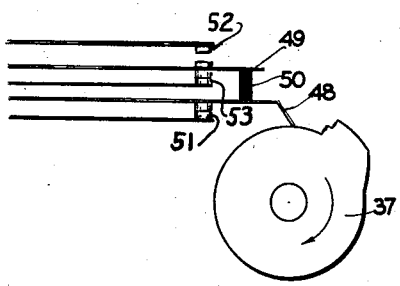
Figure 5:
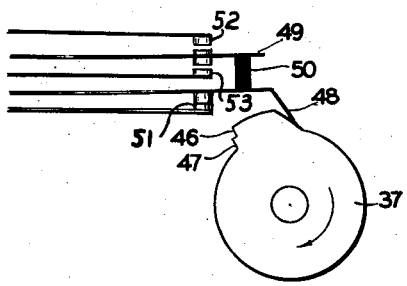

In the accompanying drawings in which one of the various possible illustrative embodiments of this invention is shown, Figure 1 is a schematic wiring diagram of the novel meteorological transmitter of the present invention, Figure 2 is a perspective view of the receiver driven needle and the sensing member, Figure 3 illustrates a cam operated switch member showing the cam after it has rotated clockwise approximately 355°, Figure 4 is a view similar to Figure 3 and shows the cam in its initial or zero position, while Figure 5 is similar to Figures 3 and 4 and shows the cam after it has rotated approximately 350°.

The novel meteorological transmitter illustrated in the drawings is adapted to transmit information relative to the barometric pressure, the wind direction, and the wind velocity. As will hereinafter be apparent, additional weather indicating instruments other than the barometer, weather vane and anemometer may readily be connected to the transmitter of the instant invention.

In general, each of the instruments, with the exception of the anemometer, is connected by suitable means into a follow-up system. The transmitter of the follow-up system is located near the weather instrument, with the transmitter leads connected to a suitable terminal strip within the meteorological transmitter of the present invention. By means of a rotary selector switch, each of the remotely positioned weather instruments is in turn connected to a self-synchronous receiver such as an Autosyn or a Magnesyn located within the unit, which acts as the receiver for all of the instrument telemetering systems. The self-synchronous receiver is provided with a contact needle which will assume the positions indicated by the condition of the weather instrument to which it is connected. After an identifying signal, a contact wiper arm rotated by an inverter, senses the position of the contact needle and transmits a pulse signal accordingly. The time interval between the identifying signal and sensing signal will indicate the reading of the weather instrument.

In the case of the anemometer signals, a 90 second interval is provided during which the keying relay of the transmitter is energized by the closing of a pair of contacts by the anemometer. The number of signal pulses thus transmitted are counted by the receiving operator, to "read" the wind velocity in miles per hour.

Referring now in detail to Figure 1 of the drawings, C designates generally the circuit of the meteorological transmitter of the present invention. Circuit C comprises a rotary selector switch 30 provided with six banks D, E, F, G, H, and J, each bank being provided with twenty-five steps or levels numbered 1 through 25. Each of the six banks of said rotary switch is provided with a wiper contact arm 31, all mounted on the same shaft (not shown) and adapted to be rotated in a clockwise direction by a stepping magnet 32. Magnet 32 has associated therewith the normally closed contacts 33, adapted to be opened upon energization of said magnet.

In the description hereinafter appearing, contact arm 31 for bank D will be referred to as 31D, for bank E as 31E, etc.; while level 1 of bank D will be referred to as level 1D, level 1 of bank E as 1E, etc.

Circuit C further comprises an inverter 34 which supplies the 400 cycle power necessary to operate a self-synchronous receiver 35 of the Magnesyn type. The shaft of the inverter (not shown) is coupled to and rotates a code wheel 36, a cam 37 of cam switch 38, and a wiper arm 39 in a clockwise direction.

For the purpose of identifying the meterological station by code letters or the like, the periphery of code wheel 36 is provided with a series of unequally spaced raised portions or teeth (not shown). Associated with said code wheel and adapted to engage the teeth thereof, is a contact arm 40. As will hereinafter appear, engagement of the contact arm 40 and a tooth of said code wheel will complete a circuit through said code wheel to the ground connection 41.

Referring now to Figures 1, 3, 4 and 5 of the drawings, the cam 37 of cam switch 38 is provided with an arcuate periphery 42 about 345° in extent, and formed with a protrusion 43 about 10° in extent. One side of said protrusion is formed with a sloped side 44 leading upwardly from the peripheral surface 42 to the periphery 45 of said protrusion. The other side of the protrusion is formed with a step portion 46 about 2° in extent, and a second step 47 to the periphery 42.

Associated with cam 37 are two switch arms 48 and 39, physically interconnected by an insulation block 50. Switch arm 48 acts as a cam follower and is adapted to ride over the periphery of cam 37. In the initial or zero position of cam 37, as shown in Figure 4, switch arm 48 engages an associated stationary contact 51, while switch arm 49 engages an associated stationary contact 53 and is disengaged from a second associated stationary contact 52.

After cam 37 has completed approximately 350° of revolution, switch arm 48 will be moved upwardly as it rides over the slope 44. Switch arm 48 will thereupon disengage stationary contact 51, while arm 49 continues to engage the stationary contact 53 (Figure 5). When switch arm 48 finally rides over surface 45 of the protrusion, switch arm 49 will disengage the contact 53 and engage the stationary contact 52.

Upon further rotation of cam 37 in a clockwise direction, switch arm 48 will drop onto the step portion 46. Switch arm 48 and contact 51 will remain open. Switch arm 49 will disengage contact 53, and remain disengaged from contact 52 (see Figure 3). Further rotation of cam 37, will permit the switch arm 48 to drop to the peripheral surface 42 to permit switch arms 48 and 49 to engage the stationary contacts 51 and 53, respectively. (Figure 4.)

Circuit C further comprises the scanning member 54 shown fragmentarily in Figure 2 of the drawings. The scanning member consists of the receiver 35 and the wiper or scanning arm 39 rotated by the shaft of the inverter 34 as previously described. Concentric with the receiver shaft 55 are two spatially fixed rings 56 and 57; ring 57 being of insulation material and hereinafter referred to as the clamping ring, ring 56 being referred to as the backing ring. Fixed to the receiver shaft by suitable means is a contact needle 58 formed with a depending contact 59. The ends of said contact needle are rotatable between the inner surfaces of the two rings 46 and 47, and are adapted to be clamped in place upon lowering of the clamping ring against backing ring.

Means is now provided to clamp the contact needle against ring 56. To this end there is provided a solenoid 60 (Figure 1) the armature (not shown) of which will lower the clamping ring by spring means (not shown) to retain the needle in position. Energization of the solenoid 60 will raise the clamping ring to permit the self-synchronous receiver to position the contact needle.

The position in which the contact needle 58 is clamped is sensed by the scanning arm 39. The scanning arm is of insulation material, the outer end of said arm being provided with four conducting inserts 61, 62, 63, and 64, all of said inserts being electrically grounded as at 65. For purposes hereinafter appearing, insert 61 is the longest of all the inserts, while insert 62 is a trifle shorter than insert 61. Inserts 63 and 64 are of equal length but shorter than insert 62. Rotation of the scanning arm 39 will brush all four inserts over the contact 59 of needle 58.

Means is now provided to transmit an identifying or reference signal upon initiating rotation of scanning arm 39. To this end there is provided a pair of depending reference contacts 66 and 67. Reference contacts 66 and 67 are radially positioned within rings 56 and 57 so that they will not be engaged by inserts 63 and 64. Insert 61 is adapted to engage both of said reference contacts, while insert 62 is adapted to engage the reference contact 67 only.

Circuit C further comprises a power relay 68. Relay 68 consists of a latch core and coil 69 and an unlatch core and coil 70. Associated with said latch coil is a switch arm 71 adapted to engage a stationary contact 72 upon energization of said coil. A latch 73 associated with the unlatch coil 70 is adapted to hold switch arm 71 in engagement with contact 72, when coil 69 becomes de-energized. Energization of coil 70 will disengage latch 73 to permit switch arm 71 to disengage from contact 72.

To facilitate the wiring of the transmitter, two terminal strips 74 and 75 are provided, terminal strip 75 being used for making the external connections. As will hereinafter be apparent, terminal strip 75 may be readily extended to provide connections for any desired number of weather indicating instruments. Terminal strip 74 is provided with nine terminal lugs numbered consecutively from 76 to 84, inclusive, while terminal strip 75 is provided with eighteen terminal lugs numbered consecutively from 85 to 102, inclusive.

The leads of the remotely positioned barometer actuated self-synchronous transmitter 165 of the Magnesyn type are connected to the terminal lugs 88, 89, 90, and 91 of the terminal strip 75. Terminal lugs 91 and 92 of said terminal strip are used for connecting a 12 volt battery supply (not shown) to the transmitter, terminal lug 91 being indicated as the positive terminal, while terminal lug 92 is indicated as the negative battery terminal. Fixed across the terminal lugs 93 and 94 is a keying relay coil 105 of a conventional radio transmitter 166, each energization of said coil causing a pulse signal to be transmitted.

The transmitter power leads are connected to terminal lugs 95 and 96. Terminal lugs 97 and 98 of the terminal strip 75 are used for connecting the remotely positioned anemometer (not shown) into the transmitter circuit. The leads of the remotely positioned vane actuated self-synchronous transmitter 167 of the Magnesyn type are connected to the terminal lugs 99, 100, 101, and 102 of said terminal strip.

*Operation*

The operation of circuit C is initiated by the operation of a clock 103. According to the preset time intervals, clock 103 will actuate a mercury switch 104 to energize the stepping magnet 32. From the prior operation of circuit C, the rotary selector switch 30 is in its "home" position, that is, wiper arms 31 are engaging levels 25 of all six banks.

Upon actuation of the mercury switch 104 a circuit is completed for the stepping magnet 32 to move the wiper arms 31 into engagement with the levels 1. The energizing circuit for said magnet may be traced from the + terminal lug 91 through lead 110, through the coil of magnet 32, leads 111 and 112, then through lead 113 to terminal lug 85 of terminal strip 74, thence through lead 114 through mercury switch 104, then through leads 115 and 116 to terminal lug 83, and from there through lead 117 to the − terminal lug 92.

With wiper arm 31E engaging level 1E, the latching coil 69 of power relay 68 is energized, to close switch arm 71 and contact 72. Closing of arm 71 and contact 72 completes the energizing circuit for the inverter 34 and turns on the radio transmitter.

The circuit energizing the latching coil 69 may be traced from the hereinbefore described + terminal lug 84 of strip 74 through wire 118, through said coil and thence through wire 119 to terminal lug 81; through wire 120 to level 1E and wiper arm 31E, through leads 121 and 117 to − terminal lug 92 of terminal strip 75.

Energization of the latching coil 69 will pull switch arm 71 past latch 73 where it will remain in engagement with contact 72 until released by energization of unlatching coil 70.

The now completed circuit for operation of the inverter 34 may be traced as follows: one terminal thereof is connected by lead 123 to the previously described + terminal lug 84, a second terminal is connected by lead 124 to terminal lug 76, said lug being in turn connected to one end of the receiver coil 125; while the third terminal is connected by lead 126 to terminal lug 82 which in turn is connected by lead 127 to contact 72. Contact 72 being engaged by the switch arm 71 which is connected by wire 116 to the previously described − terminal lug 83, completes the operating circuit for the inverter 34.

As previously described the shaft of the inverter is used to rotate the code wheel 36, the cam 37 of the cam switch 38 and the scanning arm 39.

The radio transmitter 166 is turned on in the following manner by closing of switch arm 71 and contact 72: the + power lead 110 is connected by wire 128 to one of the power terminal lugs 95 of the radio transmitter, while the other terminal lug 96 is connected by wire 129 to terminal lug 82, previously described herein as being connected by lead 127, contact 72, switch arm 71, wire 116 and lug 83 to the − power lead 117.

The closing of switch arm 71 and contact 72 will also complete a circuit for winding the clock 103, said circuit being from − lug 83, through wire 116, switch arm 71, contact 72, lead 130 through a suitable clock mechanism (not shown); then by leads 131 and 118 to the + terminal lug 84.

During the first revolution of the coding wheel 36, cam 37, and scanning arm 39, no signals are transmitted. The first revolution is used to permit the radio transmitter to warm up sufficiently before an attempt is made to transmit signals.

After the cam has rotated approximately 350°, switch arm 49 will engage contact 52 to again energize the stepping magnet 32. The coil of said magnet is connected at one end by lead 110 to the + terminal lug 91, while the other end of said coil is connected by lead 112 to contact 52. Engaging switch arm 49 is in turn connected by lead 132 to the negative power lead 117 to complete the energizing circuit. Continued rotation of the cam 37 will disengage switch arm 49 and contact 52 to de-energize the stepping magnet to permit the advance of the wiper arms 31 to levels 2.

During the second revolution of the cam 37, a steady tone is broadcast by the radio transmitter 166 due to the continued energization of the keying relay coil 105.

It will be noted that level 2 of bank E is connected by lead 133 to ground 134. When wiper arm 31E engages level 2E, the negative side of the battery, or − power lead 117 is grounded. In grounding the battery, the keying coil 105 is energized due to its ground connection 135 through lug 94 and lead 136; and its connection to the + power lead 110 through terminal lug 93.

The grounding of the negative side of the battery may be traced from ground connection 134 through lead 133, level 2E, arm 31E, lead 121 to the − power lead 117.

Energization of the keying relay will result in a steady tone signal broadcast, which will continue for 30 seconds until cam 37 has completed its second revolution to again energize the stepping magnet 32 by the engagement of switch arm 49 and contact 52 in the manner previously described.

The rotary selector switch is thus actuated for a third time, to move the wiper arms 31 into engagement with the levels 3. In this position, the rotary switch completes four circuits, that is to say, bank D will energize the clamping solenoid 60 to release the receiver controlled contact needle 58, bank E will connect the reference contact 66 into the circuit, bank F will connect the coding wheel 36 into the transmitter circuit to identify the weather station broadcasting, and banks G, H, and J will connect the barometer actuated transmitter 165 to the self-synchronous receiver 35.

Energization of the clamping solenoid takes place as follows:

After the switch arm 48 has dropped to the peripheral surface 42 of the cam 37 on its continued rotation, − power lead 117 will be connected to one side of the solenoid coil through lead 132, switch arm 49, contact 53, lead 137 to wiper arm 31D; through level 3D, lead 138 to one side of the coil. The other side of said coil is connected to the + power lead 110 by way of lead 139 to terminal lug 84.

Connection of the reference contact 66 into the transmitter circuit is by way of lead 144 to level 3E, arm 31E to — power supply by way of leads 121 and 117. Engagement of reference contact 66 by inserts 61 and 62 will ground the negative side of the battery to energize the keying relay coil 105.

The reference contacts 66 and 67 are so positioned with respect to the cycle of scanning arm rotation, that the signal broadcast thereby will appear just before the cam 37 steps the magnet 32. Thus, at the end of the third revolution of cam 37, a reference signal will be broadcast, at which time the receiving operator sets his watch. It is to be understood that the station identifying letters broadcast due to the coding wheel 36 will have ended by that time; contact arm 40 no longer engaging any of the teeth of said wheel.

Level 3F will connect the code wheel 36 into the transmitting circuit as follows:

As previously stated code wheel 36 is grounded as at 41. The code wheel contact arm 40 is connected by lead 141 to the terminal lug 87 and thence by lead 142 to level 3F. Engagement of the wiper arm 31F with level 3F will connect the negative side of the battery to ground by way of leads 121 and 117, each time the contact arm 40 engages a tooth of the code wheel 36. Each time the battery is grounded the keying relay coil will be energized to transmit a pulse signal to identify the weather station broadcasting.

The leads of the barometer actuated transmitter 165 are connected by way of terminal lug 88, lead 143 to the level 3G; by way of terminal lug 89 and lead 144 to level 3H; and by way of terminal lug 90 and lead 145 to level 3J. As previously described the fourth terminal of the barometer actuated transmitter is connected to the + terminal lug 91.

The self-synchronous receiver 35 is connected to the barometer actuated transmitter 165 by way of the wiper arms 31 of the banks G, H and J. One end of coil 125 is connected by way of terminal lug 76 through lead 146 to the wiper arm 31J; the other end of said coil is connected by way of terminal lug 77 and lead 147 to the wiper arm 31H. One end of the receiver coil 148 is connected by lead 149 to the + terminal lug 84; the other end of said coil being connected by way of terminal lug 78 and lead 150 to the wiper arm 31G.

During the third revolution of the cam 37, the code wheel will broadcast the station identification signals while the barometer actuated transmitter 165 positions the receiver with respect to the condition of the remotely positioned barometer. The clamping solenoid 60 is energized during this third revolution permitting the self-synchronous receiver to position the contact needle in accordance with the barometer reading. Since the contact needle is not clamped against the backing ring, no instrument position will be broadcast by the rotation of the scanning arm 39. Upon completion of the third revolution, the stepping magnet 32 will again be energized in the manner hereinbefore described to advance the wiper arms 31 to the levels 4.

During the fourth rotation of the cam 37, the barometer reading will be transmitted.

With the rotation of the wiper arm 31D to engage level 4D, the circuit for the clamping solenoid 60 is opened permitting the clamping ring 57 to hold the contact needle 58 against the backing ring 56. Backing ring 56 is connected by lead 151 to the levels 4F, 5F and 6F and as will hereinafter appear to the levels 8F, 9F and 10F.

During the fourth revolution of cam 37, the scanning arm will brush the inserts over the needle contact 59 to ground the negative side of the battery. Since inserts 61, 62, 63 and 64 are grounded as at 65, the battery will be grounded as by said inserts, needle contact 59, clamping ring 56, lead 151, level 4F and arm 31F; and thence by leads 121 and 117. The keying coil will thus be energized four times to broadcast four dots to signify the position of the barometer needle. The receiving operator will note the time of the needle broadcasts as referred to the time of the transmission of the reference signals appearing at the end of the third revolution of the cam 37. The operator will again receive a reference signal at the end of the fourth revolution, the time of which is again noted.

During the fifth and sixth revolution of the cam 37 by the inverter, the same circuits are maintained and the barometer reading is twice repeated.

Since the rotation of the cam and scanning arm by the inverter is not always uniform, three readings of the barometer are broadcast so that a mean or average value of elapsed time between the signals may be taken. In calculating the position of the needle, the elapsed time between the reference signal and the needle signal divided by the elapsed time between consecutive reference signals multiplied by 100 will give the instrument reading in percent of total rotation. From this percentage the position of the needle, or the barometer reading, may be calculated.

During the seventh revolution of the cam 37, the arms 31 of the rotary selector switch will engage the levels, 7. Bank D will energize the clamping solenoid 60 as previously described for level 3; bank E will connect the reference contact 67 into the transmitting circuit; bank F will cause a steady tone to be broadcast while banks G, H, and J will connect the vane actuated transmitter 167 to the self-synchronous receiver 35. Reference contact 67 is connected into the transmitting circuit by way of lead 152 to levels 7E, (8E, 9E and 10E); and by way of arm 31E and by way of wires 121 to 117 to the negative terminal 92. As previously described, reference contact 67 will engage the grounded insert 61 of the scanning arm 39 to ground the battery.

Level 7F is connected by lead 153 to switch arm 48 and thence by contact 51 and lead 154 to the ground connection 155. As previously described, arm 31F is connected to the negative side of the battery. Upon engagement of the switch arm 48 with the contact 51, the keying relay 105 will be energized to broadcast a steady tone. As indicated in Figure 5, switch arm 48 and contact 51 will be opened as the switch arm rides over the slope 44. In this way the keying relay is de-energized a short period before the complete revolution of the cam 37 to permit the reference signal due to the reference contact 67 to be broadcast.

During the seventh revolution of the cam 37, the contact needle 59 is free to be positioned by the receiver 35 which is connected by way of banks G, H and J to the vane actuated transmitter 167.

The connections of the vane actuated transmitter 167 are as follows:

Terminal lug 99 is connected to the positive power lead 110, while terminal lug 100 is connected by lead 156 to the level 7J. The terminal lug 101 is connected by wire 157 to the level 7H, and terminal lug 162 is connected by wire 158 to level 7G.

At the beginning of the eighth revolution of the cam 37 and scanning arm 39, clamping solenoid 60 is deenergized to permit the clamping of the contact needle 58. Rotation of the scanning arm will brush the inserts 61, 62, 63 and 64 over the contact needle in the manner hereinbefore described to broadcast the four-dot reference signal. Toward the end of the eighth revolution a reference signal is again broadcast due to the reference contact 67. The ninth and tenth revolutions of the cam and scanning arm will twice repeat the vane position signals. The position of the vane may then be calculated by the receiving operator in the manner heretofore described.

During the eleventh rotation of the cam and scanning arm, a steady tone will be broadcast in the same manner as during the second rotation of the cam. The ground connection 134 is connected by lead 133 to the level 11E. Engagement of the level 11E by the arm 31E will ground the negative side of the battery by way of leads 121 and 117.

During the twelfth, thirteenth and fourteenth rotations of the cam and scanning arm, the anemometer reading is broadcast. Engagement of the arm 31E with the levels 12E, 13E and 14E the negative side of the battery will be connected to ground to energize the keying relay.

One lead from the anemometer is connected by way of terminal lug 98 and lead 136 to the ground connection 135 while the other anemometer lead is connected by way of terminal lug 97 and lead 159 to the levels 12E, 13E and 14E. Engagement thereof by the arm 31E will ground the battery through leads 121 and 117. It is to be noted that during the anemometer reading broadcast the scanning arm is out of the circuit. The three revolutions assigned to the anemometer reading will consume 90 seconds during which time the number of contacts made by the anemometer in its associated circuit is counted; the number of signals received being the miles per hour of the wind velocity.

At the end of the fourteenth revolution, the stepping magnet 32 is again energized to move the arms 31 to engage the levels 15. Bank E will now energize the unlatching coil 79 of the power relay to permit the switch arm 71 to disengage the stationary contact 72; while bank F will step the magnet 32 to return the arms 31 to their "home" position.

Engagement of the arm 31E with level 15E will energize the unlatching coil 79 by way of leads 117 and 121, arm 31E and level 15E; through lead 160 and the coil; thence by lead 118 to the + terminal lug 84. Energization of the unlatching coil will move the latch 73 to permit the switch arm 71 to open. The opening of switch arm 71 and contact 72 will open the circuit of the inverter 34 and of the radio transmitter. Engagement of the arm 31F with level 15F will energize the stepping magnet 32 by way of negative lead 121, arm 31F, level 15F and thence by wire 160 through closed contact 33 and the coil of the magnet 32 to the positive lead 118.

The cam 37 will assume the position relative to switch arm 48 as shown in Figure 4 with switch arm 49 disengaging the stationary contact 52. As previously described, the energizing circuit for the stepping magnet 32 was through the switch arm 49 and contact 52. With this circuit broken, the stepping magnet 32 is now energized by way of the contact 33 and the levels 15F, 16F etc. When the arm 31F engages the contact 15F, the magnet will be energized to open the contact 33. Opening of the contact 33 will de-energize the magnet to permit the arms 31 to be advanced to the next level. This operation continues until the arms 31 engage the unconnected levels 25. It will be understood that the levels 14 through 24 may well be used for the addition of other instruments, the connection of which would be made to an extended terminal strip 75 and from there to the particular levels in a similar manner as the barometer actuated transmitter 165 and the vane actuated transmitter 167 are connected.

Summarizing the operation of the weather station heretofore described, during the first rotation of the cam 37 and the scanning arm 39, a period is provided to permit the transmitter to warm up. During the second revolution, a steady tone signal is broadcast to permit the receiving operator to tune in the weather station. The third revolution is used to broadcast the weather station identifying letters and the first reference signal with respect to the barometer readings. During the third revolution of the cam and scanning arm, the contact needle is free to be rotated by the receiver to indicate the position or reading of the barometer.

The fourth, fifth and sixth revolutions are provided to broadcast the barometer reading three times to permit an average reading to be obtained. The seventh revolution is provided to permit the receiver to re-position the contact needle with respect to the vane actuated transmitter 167. A steady tone is broadcast during this period to permit tuning of the receiver, the tone being cut short at the end of the revolution to permit the first reference signal to be broadcast. During the eighth, ninth and tenth revolutions, the weather vane reading is transmitted three times.

The eleventh revolution is given over to a continuous tone signal which is then followed by three revolutions during which the anemometer readings are broadcast.

At the completion of the fourteenth revolution, the station is automatically shut down and the rotary selector switch is "homed" to await the operation of the clock 103.

It will thus be seen that there is provided a meteorological transmitter in which the several objects of this invention are achieved and which is well adapted to meet the conditions of practical usage.

As various possible embodiments might be made of the above invention and as various changes might be made in the embodiment above set forth, it is to be understood that all matter herein set forth, or shown in the accompanying drawings is to be interpreted as illustrative and not in a limiting sense.

Having thus described my invention, I claim as new and desire to secure by Letters Patent:

1. A meteorological transmitter comprising, a plurality of remotely positioned weather indicating instruments, a transmitter for each of said instruments and actuated thereby, a receiver, a selector switch for connecting selectively each of said transmitters to said receiver, a contact adapted to be positioned by said receiver, sensing means adapted to be rotated from an initial position to engage said contact, a keying relay, and means responsive to the engagement of said contact and said sensing means to energize said relay to indicate the position of said contact relative to said initial position.

2. A meteorological transmitter comprising a plurality of remotely positioned weather indicating instruments, a transmitter for each of said instruments and actuated thereby, a receiver, a selector switch for connecting selectively each of said transmitters to said receiver, a contact adapted to be positioned by said receiver, a scanning arm adapted to be rotated from an initial position and to engage said contact, a reference contact adapted to be engaged by said scanning arm, a keying relay, energization of which will transmit a signal; and means associated with said scanning arm and said contacts to energize said relay.

3. A meteorological station comprising transmission means, a relay to key said transmission means, a plurality of remotely positioned weather indicating instruments, a transmitter for each of said instruments and actuated thereby, a receiver, means for selectively connecting said transmitters to said receiver, an electrical contact adapted to be positioned by said receiver, a scanning arm adapted to be cyclically rotated from an initial position to engage said positioned contact, a reference contact adapted to be engaged by said scanning arm, and electrical means associated with said scanning arm and said contacts to energize said relay.

4. A meteorological station comprising transmission means, a relay to key said transmission means, a plurality of remotely positioned weather indicating instruments, a transmitter for each of said instruments and actuated thereby, a receiver, means for selectively connecting said transmitters to said receiver, an electrical contact adapted to be positioned by said receiver, a scanning arm adapted to be cyclically rotated from an initial position to engage said positioned contact, the rotation of said scanning arm from its initial position being in conjunction with the selective connections of said connecting means, a reference contact adapted to be engaged by said scanning arm, and electrical means associated with said scanning arm and said contacts to energize said relay.

5. A meteorological transmitter comprising transmission means, a relay to key said transmission means, a plurality of remotely positioned weather indicating instruments, a transmitter for each of said instruments, a servo receiver, a motor, a chronometric switch adapted to initiate operation of said transmission means and said motor, a cam switch driven by said motor, a selector switch actuated periodically by said cam switch to selectively connect said transmitters to said receiver, a contact adapted to be positioned by said receiver, a reference contact, a scanning arm rotated by said motor and adapted to engage said contacts, and electrical means associated with said scanning arm and said contacts to energize said relay upon engagement of said arm and said contacts.

6. A meteorological transmitter comprising transmission means, a relay to key said transmission means, a plurality of remotely positioned weather indicating instruments, including an anemometer, a transmitter for each of said instruments with the exception of said anemometer, a receiver, a motor, a chronometric switch adapted to initiate operation of said transmission means and said motor, a cam switch driven by said motor, a selector switch actuated periodically by said cam switch to selectively connect said transmitters to said receiver, and to connect in turn said anemometer to said transmission means, a contact adapted to be positioned by said receiver, a reference contact, a scanning arm rotated by said motor and adapted to engage said contacts, electrical means associated with said scanning arm and said contacts to energize said relay upon engagement of said arm and said contacts, and means associated with said selector switch to disconnect said scanning arm from said transmission means upon connection of said anemometer to said means.

7. A meteorological station comprising, transmission means, a relay to key said transmission means upon energization thereof, a source of D. C. supply, an inverter, a plurality of weather indicating instruments, a transmitter for each of said instruments, a receiver, a selector switch for connecting selectively the transmitters to said receiver, a chronometric switch to connect said transmission means and said inverter to said D. C. supply and to initiate operation of said selector switch, said inverter supplying the A. C. necessary to operate said transmitters and said receiver, a cam switch and a scanning arm driven by said inverter, said cam switch being actuated periodically to operate said selector switch, said cam switch being further adapted to energize said keying relay through said selector switch for transmitting a steady time signal over said transmission means; a reference contact adapted to be engaged by said scanning arm, a contact adapted to be positioned by said receiver, and electrical means associated with said scanning arm and said contacts to energize said relay each time said scanning arm engages said contacts.

8. A meteorological station comprising, transmission means, a relay to key said transmission means upon energization thereof, a source of D. C. supply, an inverter, a plurality of weather indicating instruments, including an anemometer, a transmitter for each of said instruments, excepting said anemometer, a receiver, a selector switch for connecting selectively the transmitters to said receiver, a chronometric switch to connect said transmission means and said inverter to said D. C. supply and to initiate operation of said selector switch, said inverter supplying the A. C. necessary to operate said transmitters and said receiver, a cam switch and a scanning arm driven by said inverter, said cam switch being actuated periodically to operate said selector switch, a reference contact adapted to be engaged by said scanning arm, a contact adapted to be positioned by said receiver, electrical means associated with said scanning arm and said contacts to energize said relay each time said scanning arm engages said contacts, and means associated with said selector switch to disconnect said scanning arm from said transmission means upon connection of said anemometer to the keying relay of said transmission means.

9. A meteorological station comprising, transmission means, a relay to key said transmission means upon energization thereof, a source of D. C. supply, an inverter, a plurality of weather indicating instruments, including an anemometer, a transmitter for each of said instruments, excepting said anemometer, a receiver, a selector switch for connecting selectively the transmitters to said receiver, a chronometric switch to connect said transmission means and said inverter to said D. C. supply and to initiate operation of said selector switch, said inverter supplying the A. C. necessary to operate said transmitters and said receiver, a cam switch and a scanning arm driven by said inverter, said cam switch being actuated periodically to operate said selector switch, a coding wheel driven by said inverter, a contact adapted to engage said wheel, said selector switch connecting in turn said coding wheel and said contact to the keying relay of said transmission means, a reference contact adapted to be engaged by said scanning arm, a contact adapted to be positioned by said receiver, electrical means associated with said scanning arm and said contacts, and said coding wheel and its associated contact, to energize said relay each time said scanning arm engages said contacts and each time said coding wheel is engaged by its associated contact, means associated with said selector switch to disconnect said scanning arm from said transmission means upon connection of said anemometer, and again upon connection of said coding wheel and its associated contact, to the keying relay of said transmission means.

10. A meteorological transmitter comprising transmission means, a relay to key said transmission means upon energization thereof, a source of D. C. supply, an inverter, a plurality of remotely positioned weather indicating instruments, a transmitter for each of said instruments adapted to be actuated thereby, a receiver, a selector switch, a cam switch, a scanning arm; and a coding wheel adapted to be rotated by said inverter; said cam switch being actuated periodically to operate said selector switch, said cam switch being further adapted to energize said keying relay through said selector switch for transmitting a steady time signal over said transmission means; a contact adapted to be positioned by said receiver, a contact adapted to engage said coding wheel, clamping means for said first contact to hold it in the position to which it has been moved by said receiver, a solenoid to actuate said clamping means, said cam switch being further adapted to control the energization of said solenoid through said selector switch; and a chronometric switch adapted to initiate operation of said inverter, said transmission means and said selector switch; said selector switch selectively connecting said transmitters to said receiver to position said contact, and said coding wheel and contact to said relay, said solenoid releasing said clamping means during contact positioning, said scanning arm engaging said positioned contact to energize said relay.

11. A meteorological transmitter comprising transmission means, a relay to key said transmission means upon energization thereof, a source of D. C. supply, an inverter, a plurality of remotely positioned weather indicating instruments, a transmitter for each of said instruments adapted to be actuated thereby, a receiver, a selector switch, a cam switch, a scanning arm; and a coding wheel adapted to be rotated by said inverter; said cam switch being actuated periodically to operate said selector switch, a contact adapted to be positioned by said receiver, a contact adapted to engage said coding wheel, clamping means for said first contact to hold it in the position to which it has been moved by said receiver, a reference contact adapted to be engaged by said scanning arm, a solenoid to actuate said clamping means, and a chronometric switch adapted to initiate operation of said inverter, said transmission means and said selector switch; said selector switch selectively connecting said transmitters to said receiver to position said contact, and said coding wheel and contact to said relay, said solenoid releasing said clamping means during contact positioning, said scanning arm engaging said positioned contact and said reference contact to energize said relay.

GEORGE S. MILES.

REFERENCES CITED

The following references are of record in the file of this patent:

UNITED STATES PATENTS

| Number | Name | Date |
| --- | --- | --- |
| 1,699,759 | Shepherd | Jan. 22, 1929 |
| 2,121,184 | Buckley | June 21, 1938 |
| 2,207,743 | Larson et al. | July 16, 1940 |
| 2,287,786 | Diamond | June 30, 1942 |